United States Patent
Korupp et al.

(10) Patent No.: US 8,944,787 B2
(45) Date of Patent: Feb. 3, 2015

(54) CIRCULATING DEVICE FOR BATHS

(75) Inventors: Sascha Korupp, Asslar-Werdorf (DE); Gundolf Opsoelder, Driedorf (DE)

(73) Assignee: Herborner Pumpenfabrik J.H. Hoffman GmbH & Co. KG, Herborn (DE)

( * ) Notice: Subject to any disclaimer, the term of this patent is extended or adjusted under 35 U.S.C. 154(b) by 191 days.

(21) Appl. No.: 13/271,400

(22) Filed: Oct. 12, 2011

(65) Prior Publication Data

US 2012/0090087 A1    Apr. 19, 2012

(30) Foreign Application Priority Data

Oct. 12, 2010   (DE) .......................... 10 2010 038 137

(51) Int. Cl.

| F04D 13/06 | (2006.01) |
|---|---|
| F04D 13/16 | (2006.01) |
| B01D 29/96 | (2006.01) |
| B01D 35/30 | (2006.01) |
| F04D 29/70 | (2006.01) |

(52) U.S. Cl.
CPC ............... F04D 13/06 (2013.01); B01D 29/96 (2013.01); B01D 35/30 (2013.01); F04D 29/708 (2013.01); B01D 2201/301 (2013.01)
USPC ............... 417/423.14; 417/423.9; 210/167.12

(58) Field of Classification Search
CPC ..... F04D 29/026; F04D 29/426; F04D 29/70; F04D 29/708; B01D 29/11; B01D 29/13; B01D 29/15; B01D 29/23
USPC ...... 417/234, 423.1, 423.9, 423.14; 210/167.12, 232, 237, 452; 220/23.87, 220/262, 263
See application file for complete search history.

(56) References Cited

U.S. PATENT DOCUMENTS

| 2,946,474 | A | * | 7/1960 | Knapp ........................ 220/23.87 |
|---|---|---|---|---|
| 3,011,644 | A | * | 12/1961 | Farrell et al. .................. 210/237 |
| 3,637,331 | A | * | 1/1972 | Smith et al. ................ 417/423.9 |
| 3,920,352 | A | * | 11/1975 | Speck et al. .................. 415/200 |
| 3,959,137 | A | * | 5/1976 | Kirsgalvis ..................... 210/791 |
| 4,059,519 | A | * | 11/1977 | Zieg ......................... 210/167.12 |
| 4,773,823 | A | * | 9/1988 | Pease ............................ 415/177 |
| 5,178,523 | A | * | 1/1993 | Cheng-Chung ............ 417/423.3 |
| 6,688,845 | B2 | * | 2/2004 | Pages Pages ................. 415/58.4 |
| 7,531,092 | B2 | * | 5/2009 | Hazlehurst ................. 210/416.2 |

FOREIGN PATENT DOCUMENTS

| DE | 1 943 170 | 7/1966 |
|---|---|---|
| DE | 76 276 66 | 6/1978 |
| DE | 34 37 365 | 4/1986 |
| DE | 694 04 817 | 12/1997 |

* cited by examiner

*Primary Examiner* — Peter J Bertheaud
(74) *Attorney, Agent, or Firm* — Clark & Brody

(57) ABSTRACT

The invention relates to apparatus driving circulation in baths, pools and the like, comprising a pump powered by a drive, further a filter section consisting of a housing and a cover, a filter being configured in said housing and being kinematically linked by hookup elements to the cover in a manner that said filter moves jointly with said cover.

13 Claims, 9 Drawing Sheets

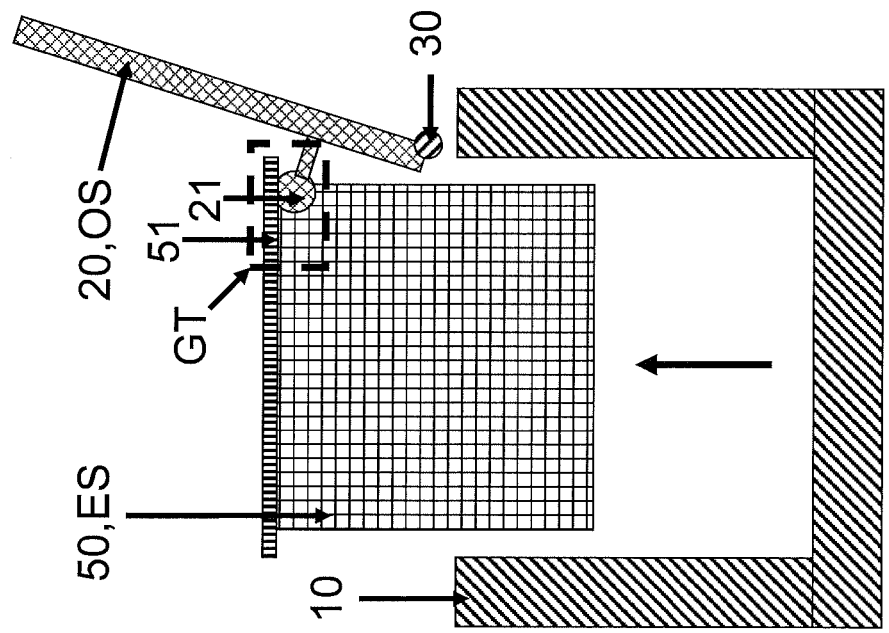
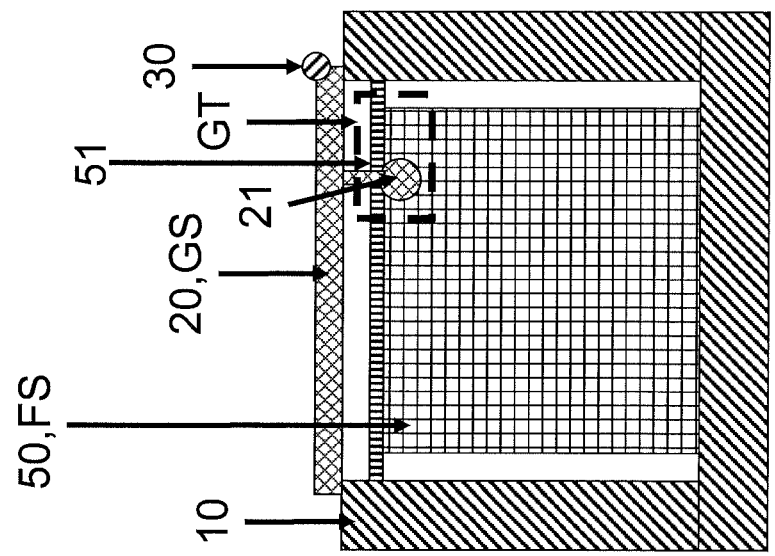

CIRCULATING DEVICE FOR BATHS

FIELD OF THE INVENTION

The present invention relates to a circulation driving apparatus—hereafter circulation apparatus—for baths, spas, pools and the like, as defined in the preamble of claim 1.

BACKGROUND ART

Such circulation apparatus is used in swimming pools, jacuzzis and the like demanding strong flows or high volumes of water for filtering. Commensurately powerful pumps are required to provide the related high circulating flows.

A fairly coarse sieve to catch substantial parts (for instance filaments, twigs, tools etc.) that endanger these pumps is usually mounted on their suction side. Accordingly such substantial parts are precluded from entering the pump and the circulation apparatus offers long service life. Fine filtering also may be provided, the fine filter usually being mounted on the pump's output side, because the pump's [absolute] pressure output typically being larger than the [absolute] suction input and the filter media entailing an [absolute] pressure drop larger than the [absolute] suction input of the pump.

The German patent document DE 76 276 66 U1 discloses a bath/pool circulation apparatus comprising a pump powered by a drive. A filter section is configured on the pump's suction side and consists of a housing and a cover. The cover is fixed in place by two wingnuts.

The U.S. Pat. No. 299,143 S also shows such a design, however the cover is fitted with two mechanical stops, each being a screw fitted with a knob.

The present state of the art incurs the drawback that the basket collecting the detritus/dirt will soil rapidly but nevertheless is not cleaned regularly because of its handling. This feature increases the flow impedance, entailing moving less water for a given original pump output.

In fact, the time required for cleaning is an obstacle to operation. The state of the art's locking by means of screws entails long cleaning times. After loosening the screws, the cover too must be removed as a whole. In view of the typical ambient conditions, this cover then usually is deposited on a soiled surface. Adhering dirt must be removed—at least on the sealing side—before said cover may be reinstalled later. Such reinstallation in turn requires first properly positioning the cover, while the force sealing it is determined by the depth of engagement of the affixing elements. The user in this process must to screw-in the two affixing elements in alternating manner to assure uniform compression to attain sealing between the cover and the housing. Also necessity of tools typically hampers regular cleaning.

A further drawback of the state of the art requires the user to touch the water inside the housing when removing the filter set therein. The user finds the existing soiling distasteful. Worse, insects still alive such as wasps and bees may be found in such locations and sting the user removing the filter.

Said filter being very heavy, it is extricated from the housing only with substantially difficulty. It is located operationally so deep inside said housing as to be accessible only with difficulty and must be emptied by slow extraction before being fully removed. The more soiled the filter, the longer it takes to drain its water and hence its removal. This chore must be carried out by a bent-over person over during said time interval.

SUMMARY OF THE INVENTION

Accordingly it is the objective of the present invention to remedy the drawbacks of the state of the art. In particular the invention relates to cleaning the filter comfortably, in simplified and more accessible manner, and more quickly. The invention shall also offer easy installation, economical manufacturing costs and high quality with long service life.

The invention relates to a bath/pool circulation apparatus comprising a pump powered by a drive element, further a filter section constituted by a housing and a cover, whereat a filter being configured within the housing and can be kinematically coupled to said cover in a manner that when said cover is moved, said filter is commensurately displaced.

This design allows moving the filter out of its operational position already when the cover is being opened. Because of the lever arm subtended by the cover only little effort is needed by the user to displace the filter basket in order to move the filter itself. The filter is raised by the cover moving in the direction of opening. Accordingly, when the cover is in its open position, the filter has been moved into a raised position of extraction. Preferably the filter shall then project out of the housing. As a result already at least part of the water may be drained without the user needing to directly lift and hold the filter. Moreover the user now is less bent-over and exerts himself less to remove the filter, because part of the water already having drained away. Considering the raised position of extraction, the user has good access to the filter, nor does he/she dip into the water. Accordingly the work is more pleasant and the user also is well protected from dirt and parasites.

Accordingly the hookup element shall be designed in a way to allow removing the filter without entailing further installation steps. Additionally such a design assures rapid and simple filter assembly in production, with attending low manufacturing costs.

The invention offers the further advantage that the cover remains in its open position in spite of the force applied on it by the filter. In this manner the user may relax in his/her upright position until the water has drained as much as possible from the filter and the remove it. After being emptied, the filter then may be moved by closing the cover into its operational position.

In one embodiment mode of the invention, a hookup element is fitted on the cover. This design allows integrally manufacturing the cover and the hookup element, attaining economy of manufacture and firm affixation of said element to the cover. Quality is improved too, a displacement of said cover being smooth and free of play.

In an additional embodiment mode, a hookup element is fitted on the filter. This design allows integrally manufacturing the filter and the hookup element, attaining low costs and providing firm affixation of the hookup element on the filter.

In another advantageous embodiment mode, the hookup element is a drive pin. Such a drive pin is easily fashioned onto the cover with which it may be integral. Also it requires only minimal amounts of additional material, and costs are kept low. A drive pin of that kind is load bearing and is little susceptible to mechanical destruction. High-quality and long-life operation are therefore assured.

In a further especially advantageous embodiment mode of the present invention, the hookup element is a drive-element guide. Such a drive-element guide is easily fashioned at the filter and may be made integrally with it. Only little additional quantity of the required material is needed, again offering economical manufacture.

The drive pin and the drive-element guide may constitute a cam mechanism converting a drive pin motion into a linear motion of the drive-element guide, allowing the filter to be raised/lowered relative to the housing. A force may be applied directly, i.e. absent any detour, from the drive pin to the drive-element guide and hence onto the filter, as a result of which little force/power shall be lost for instance by friction. The force applied by the user is used efficiently and with substantial comfort.

Preferably the drive-element guide is integrated into a collar configured at an upper edge of the filter. Such a collar reinforces the filter and moreover may match an opposite inner side of said housing. Preferably it shall minimize the play between the filter and the housing to keep said filter in its operational position. Also undue filter warping caused by loads as they arise, especially when removing the filter, shall be prevented in this way. Integrating the drive-element guide into said collar minimizes further costs and configuration expenditures. Besides, the distance between the upper edge and the cover is minimized, allowing reducing the size of the hookup elements and very direct linkage.

In one embodiment mode of the invention, the cover is rotatably supported onto a pivot element. In this manner there is only one degree of freedom for the cover which can be opened by rotation. This feature results in a simple, guided, circular opening motion. Nor is the user forced to completely remove the cover and as a result said cover is free from soiling as would take place if it were deposited on the ground/floor. Again, the cover being returned by means of said pivot element into the proper position, the user is spared any additional positioning.

Accordingly, when displacing the cover from a closed into an open position, a drive element configured at the cover describes a circle around the pivot element. Such a rotation may be converted by the drive-element guide into a translation causing the filter to be raised.

In an especially preferred embodiment mode of the present invention, the guide means are configured at the filter and/or at the housing. Said means may be rails or grooves. These guide means assure that the filter shall be guided to be precluded from rotating or tilting relative to the housing. In particular such a prohibition shall be effective from the operational through the removal settings to assure guiding both the filter being lowered into the operational position and being raised without tilting and without detachment between the drive element and the drive-element guide. Rotation and tipping however are allowed above the removal position to allow easier filter insertion and removal. This design makes possible especially simple and reliable handling. When the design is integral, additional costs also are minimized.

In idealized manner, at least one guide means is fitted with an oblique insertion means. This design foremost considerably simplifies filter insertion, this filter being inserted automatically into its specified position without being tilted.

In a further embodiment mode of the invention, both the housing and the cover are fitted with a respective support-element. These support-elements allow mounting a mechanical stop to stop the filter at the housing. In the case of integral manufacture, further elements to receive the mechanical stop are not needed, manufacturing costs therefore being minimized.

In especially advantageous manner, such a mechanical stop is in the form of a locking claw fitted with an engaging means as the mechanical stop. Handling of such locking claws is simple and does not require tools. The user enjoys high comfort due to a short actuations at low drive forces.

In one embodiment mode of the invention, the locking claw is supported in kinematically rotatable manner by a clamping-lock pivot element at one of the support-elements and in that the engaging means can detachably engage the other support-elements. Accordingly the locking claw may situated at the cover or at the housing when the cover is in the open position. In general a design is preferred where the locking claw is configured at the housing. However in either case the locking claw rests on one side and need not be removed by the user when the filter is being cleaned. As a result said locking claw is also directly situated at the appropriate side during the locking procedure and can moved merely with one manual displacement to engage the other support-element and into a locked position. This feature considerably simplifies filter cleaning.

In another embodiment mode of the invention, the locking claw is constituted by a main segment and an intermediate segment kinematically rotatably linked to said main segment. By means of the locking claw's pivot element, the intermediate segment is supported in one of the support-elements, and the engaging means and the engaging means is configured at said main segment. The distance between said pivot element and the engaging element may be changed by rotating the intermediate segment relative to the main segment, as a result of which the locking claw may easily engage an associated support-element. Said distance is shortened when the locking claw is being locked, resulting in latching.

In another preferred embodiment mode of the invention, in the engaged locking claw position, a distance between the locking claw pivot element and the engaging means is equal to a distance between the support-elements. Furthermore, in the event of a closed cover and the locking claw being unlocked, the distance between the support-elements is larger than the distance between the locking claw pivot element and the engaging means in the locked position. As a result a tension is present in the locking claw between the pivot element and the engaging means, and, due to said tension, the cover compresses the housing. When predetermining the tensile force by selecting the distance between the pivotal element and the engaging means in the locked position, the user no longer needs adjusting the force himself. This feature accelerates locking and the sealing of the cover is assured by the adjusted force. Moreover the locking claw may be secured in the locked position by means of its own tension. Therefore further securing means are not required, costs are minimized, and operation is very convenient.

Preferably the locking claw is fitted with an actuation element operated by the user and in the form of a lever arm that can be displaced relative to the mechanical stop axis. This actuation element should be enclosed by a free, radial space to allow easy user access behind it. This feature facilitates actuating the locking claw, increasing user comfort.

BRIEF DESCRIPTION OF THE DRAWINGS

Further features, details and advantages of the present invention are stated in the claims and follow from the description below of embodiment modes of the invention shown in the appended drawings.

FIG. 6a is a schematic sketch of a kinematic link between the cover and the filter in the cover's closed position, FIG. 6b is a schematic sketch of a kinematic link between the cover and the filter in the cover's open position.

DETAILED DESCRIPTION OF THE DRAWINGS

Figure 1:
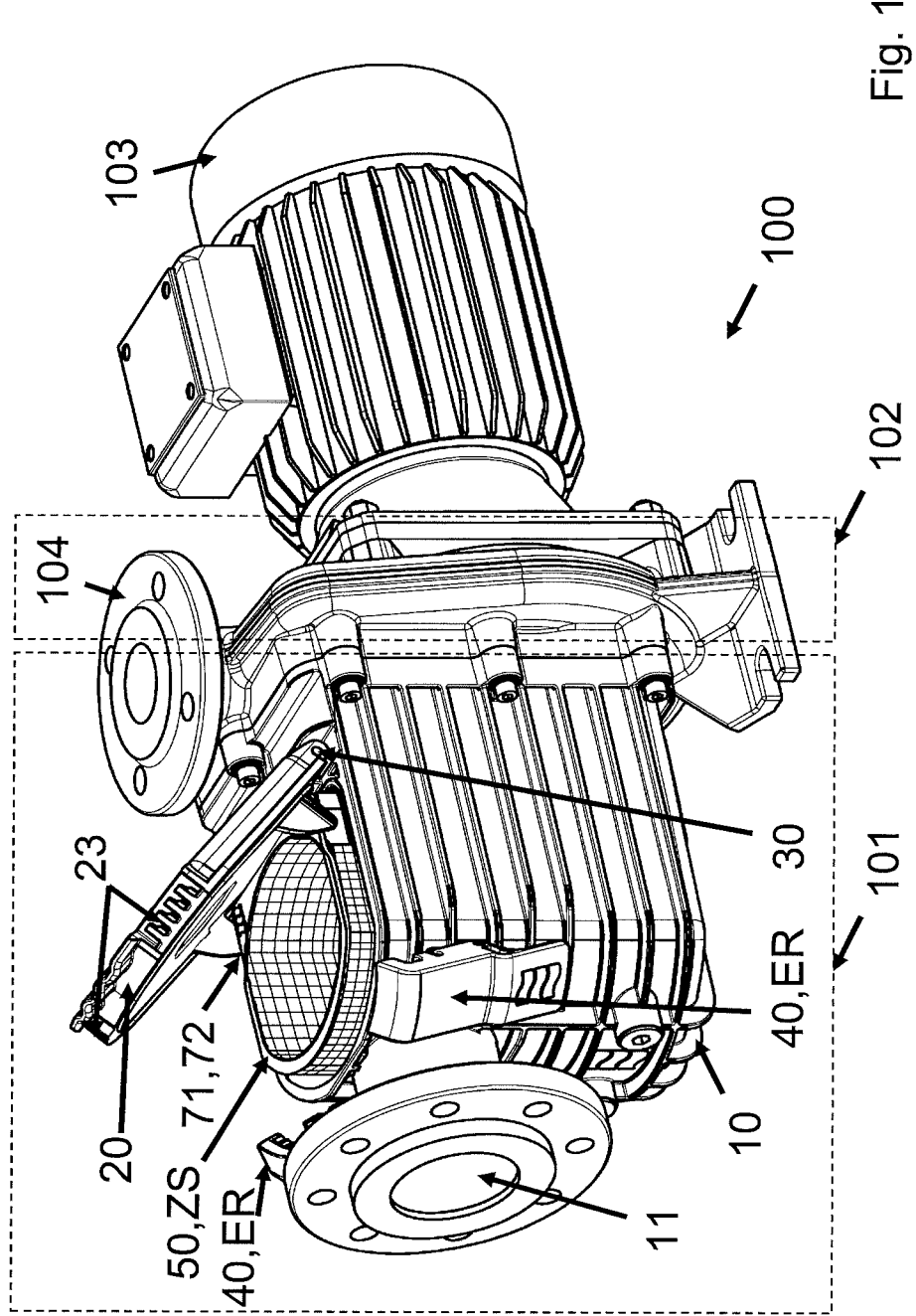
FIG. 1 shows a circulation apparatus with a half-open cover.

FIG. 1 shows a circulation apparatus 100 for baths and pools, comprising a pump 102 powered by a drive element 103 and a filter section 101. Said filter section comprises a housing 10, a cover 20 and a filter 50 configured in the housing 10. An intake 11 feeds water to the circulation apparatus and in turn may be connected to a water feed conduit. The pump 102 connected to the housing 10 comprises at its pressure side a discharge 104 that may be hooked up to a conduit or a fine filter.

The filter 50 is connected by hookup elements 71, 72 to the cover 20, as a result of which—in the shown open position of said cover—said filter assumes a slightly raised intermediate position ZS. Opening the cover is feasible in that two locking claws 40 assume an unlocked position ER and are disengaged from support-elements 23 fitted into the cover 20. On the side away from the locking claw 40, this cover 20 is rotatably supported at the housing 10 by a pivot element 30.

Figure 2:
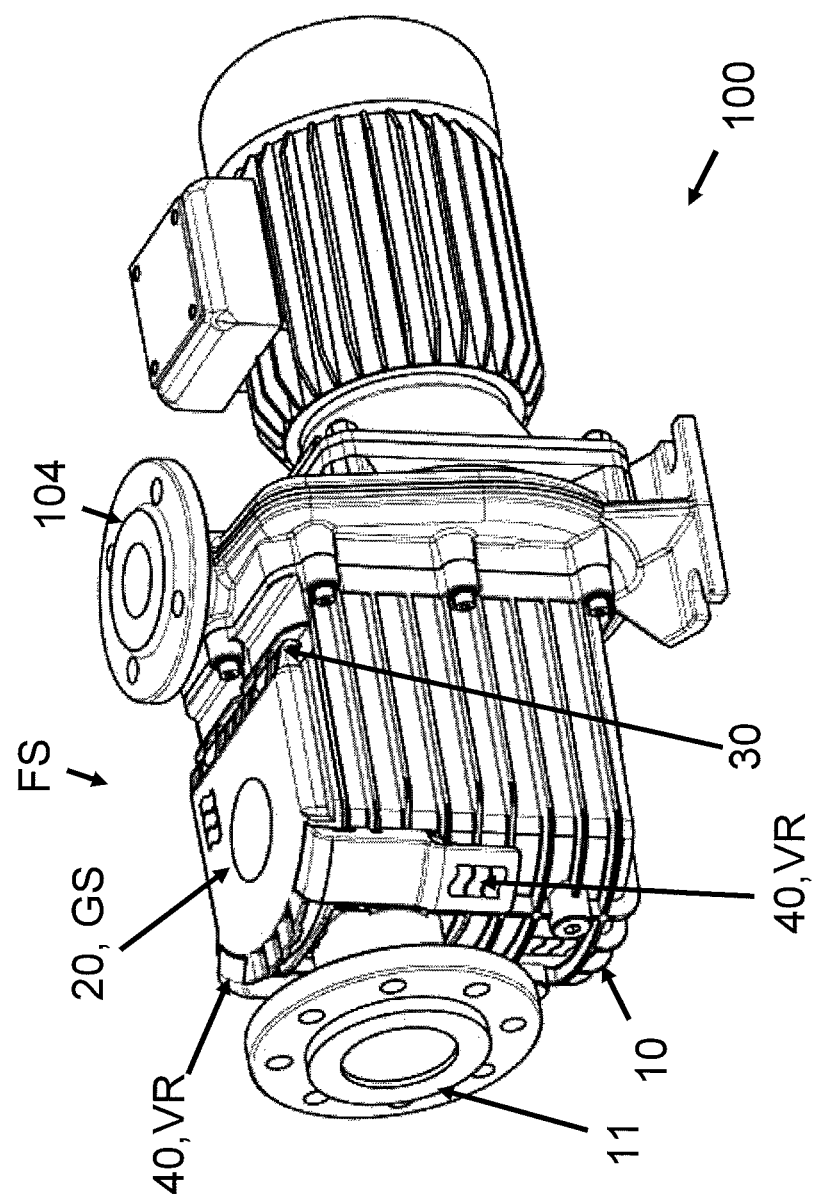

FIG. 2 shows a circulation apparatus 100 where the cover 20 is in its closed position GS. Two locking claws 40 engage support-elements fitted into the cover 20 and assume a locking position VR. In conjunction with a pivot element 30, the cover 20 henceforth is stopped by said claws relative to the housing 10. An omitted filter configured in the housing 10 assumes the operational position FS allowing water to run in controlled manner from an intake 11 to a discharge 104 through said filter.

Figure 3:
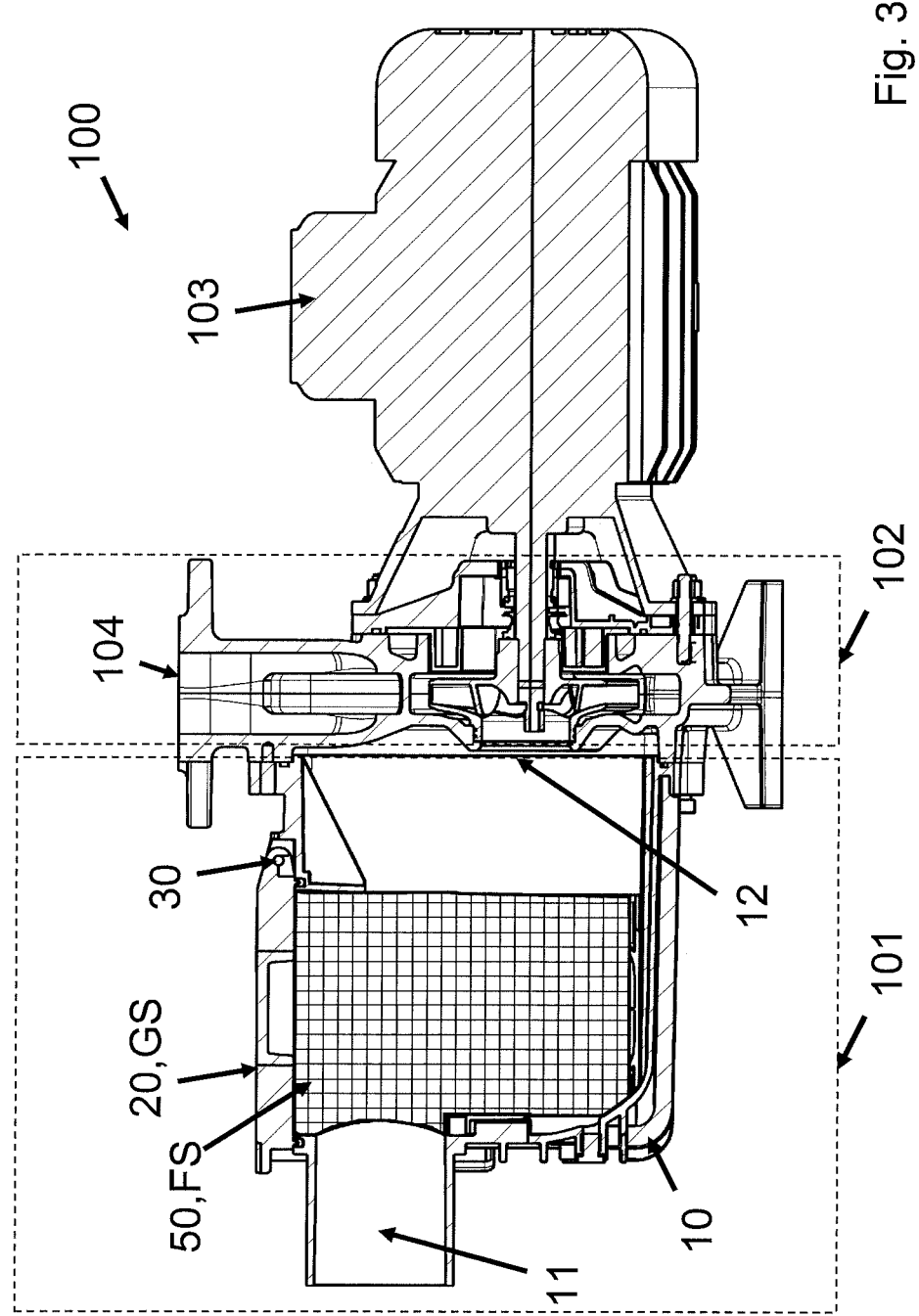
FIG. 3 is a vertical cross-section of a circulation apparatus, its cover being closed.

FIG. 3 is a cross-sectional elevation of a circulation apparatus 100 and shows a pump 102 which is powered by a drive element 103 and is fitted with a filter section 101. This section 101 is constituted by a housing 10, a cover 20 and a filter 50 configured in said housing 10. The water enters the housing by a feed 11 and exits it at the pressure side of the pump 102 through a discharge 104. The pump 102 and the filter section 101 are hydraulically connected by a communicating aperture 12.

According to the elevation of FIG. 3, the cover is in a closed position GS and the filter 50 in an operational position FS, as a result of which water flowing through the circulation apparatus 100 first passes through the filter 50 before it reaches the pump 102.

Figure 4:
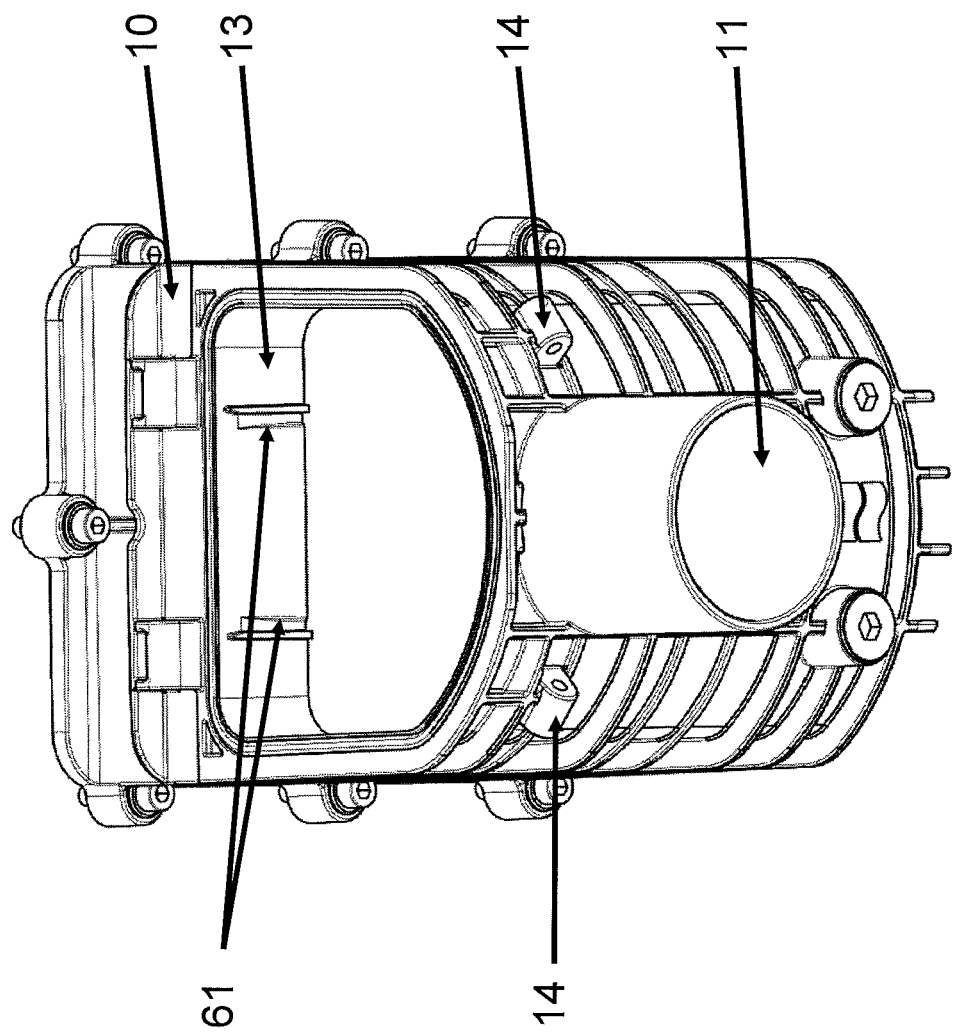
FIG. 4 shows a housing of a filter section.

FIG. 4 is a detailed view of a housing 10 for a filter of the circulation apparatus of the invention. The housing 10 is made integrally with an intake 11 and also comprises two support elements 14, further guide means 61 configured on the inside of the housing 10. The guide means 61 also are integral with the housing 10 and in the form of ribs and groove.

Figure 5:
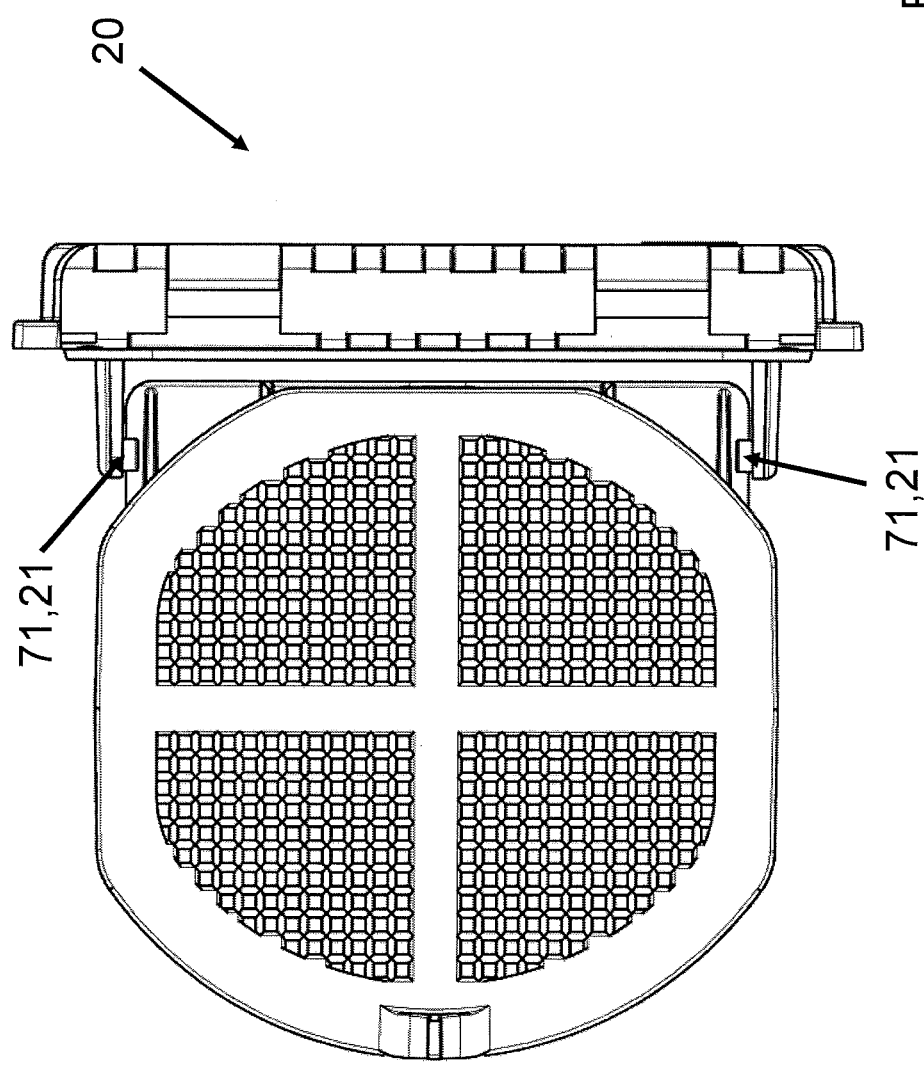
FIG. 5 shows a cover.

FIG. 5 shows a cover 20 for a filter of a circulation apparatus of the invention. Two hookup elements 71 each in the form of a drive element 21 are subtended at the lower side of the cover 20.

In a further elucidation of the invention, FIGS. 6a and 6b are schematic sketches of a housing 10, a filter 50, and a cover 20 supported by a pivot element 30 on the housing 10. A drive element 21 is mounted on the cover 20 and a filter 50 supports a drive-element guide 51 kinematically linked to the drive element 21. Jointly, the drive element 21 and the drive-element guide 51 connected to it constitute a cam drive GT.

In FIG. 6a the cover 20 is in its closed position GS and the filter 50 is in an operational position FS. When the cover 20 is pivoted about the pivot element 30, the drive element 21 moves circularly about this pivot element. This motion is converted by the cam drive GT into a translation of the drive-element guide 51, as a result of which the filter 50 is moved out of its operational position FS. When the said cover is in its open position OS, the filter 50 then will be in an extraction position ES as shown in FIG. 6b. In that position, the filter 50 may then be raised farther and ultimately be cleaned. This procedure is carried out quite ergonometrically because the said raised position lessens bending by the user who need not plunge his hand into the water inside the housing and moreover can easily grip the filter 50, part of the water already having drained off it and the weight to be lifted being commensurately less.

Figure 7:
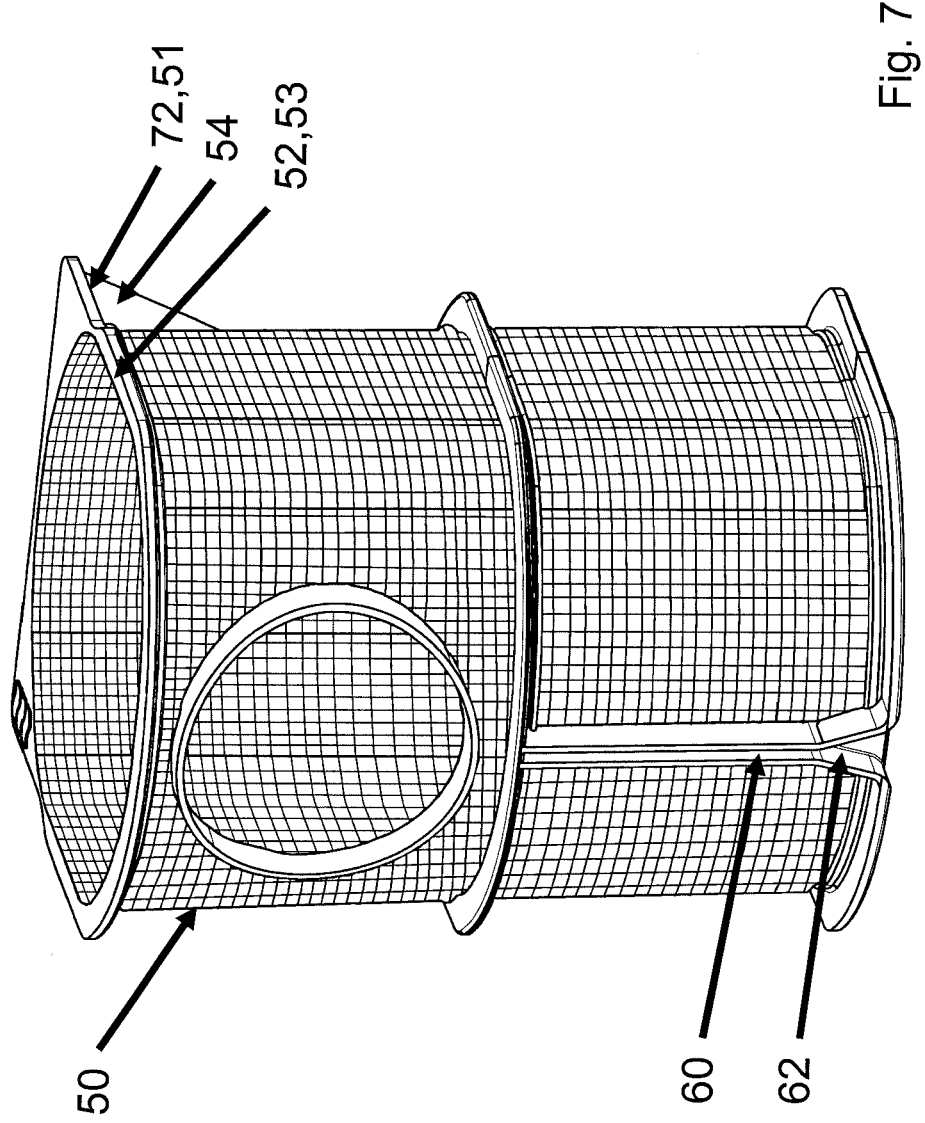
FIG. 7 is a filter's front view.

FIG. 7 is a detailed view, shown in front elevation, of a filter 50 for a filter section of a circulation apparatus of the invention. A collar 53 is constituted at an upper edge 52 of the filter 50 and encloses this filter totally. A hookup element 72 in the form of a drive-element guide 51 is integrated into said collar 53. A reinforcing rib 54 is used to increase the rigidity in the vicinity of the drive-element guide 51. The filter 50 moreover is fitted with a guide means 60 comprising an oblique insertion element 62. The shown filter 50, together with the collar 53, the reinforcing rib 54 and the guide means 60 all are made integrally as one piece by plastic injection molding.

The guide means 60 match an omitted, opposite housing and/or guide means affixed to it in a manner to preclude the inserted filter 50 from rotating or tipping, thereby keeping it all the time in its proper position. Moreover the guide means 60 prevent the filter from jamming, as a result of which the filter may be smoothly raised or lowered.

Figure 8:
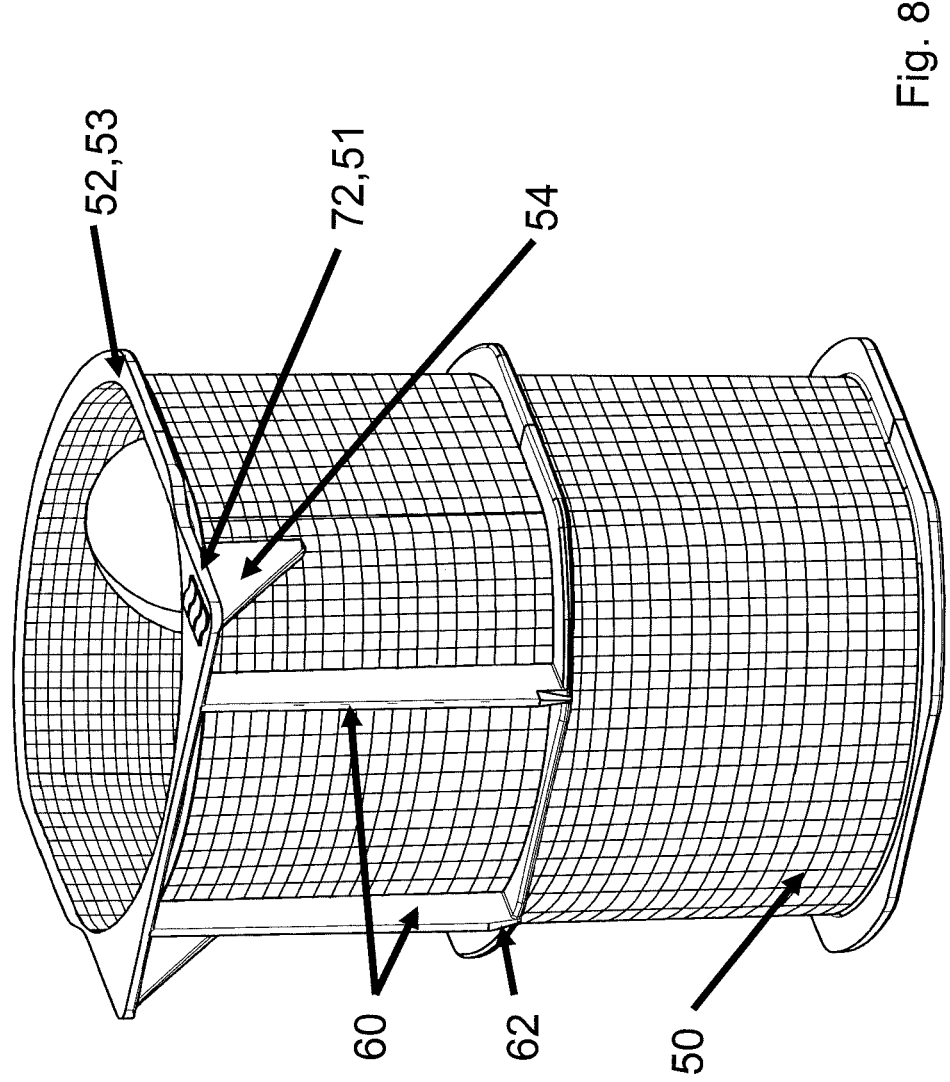
FIG. 8 is a filter's back view.

FIG. 8 shows a rear view of the filter 50 for a filter section of a circulation apparatus of the invention. A collar 53 is subtended at an upper edge 52 of the filter 50 and fully encloses said filter 50. An integrated hookup element 72 in the form of a drive-element guide 51 is integrated into said collar 53. A reinforcing rib 54 if also configured in the vicinity of the drive-element guide 51 to increase rigidity. Also the filter 50 is fitted with guide means 60 comprising oblique insertion elements running across the upper half of the filter 50.

Said guide means 60 match an omitted housing and/or guide means mounted on it in a manner to preclude rotating of tipping the filter 50 when in its inserted position, as a result of which it is permanently kept in its proper position. They also prevent the filter 50 from jamming within the housing, and as a result allow smoothly lifting/lowering it. When the filter 50 is fully extracted from the housing, it no longer passes through the guides 60 when extracted more than half, as a result of which it can be removed for instance slightly obliquely or with a slight rotation. This feature also facilitates its insertion, following being cleaned into the housing, considering that said filter initially is inserted at a roughly proper alignment, being increasingly accurately aligned as the depth of insertion increases.

Figure 9:
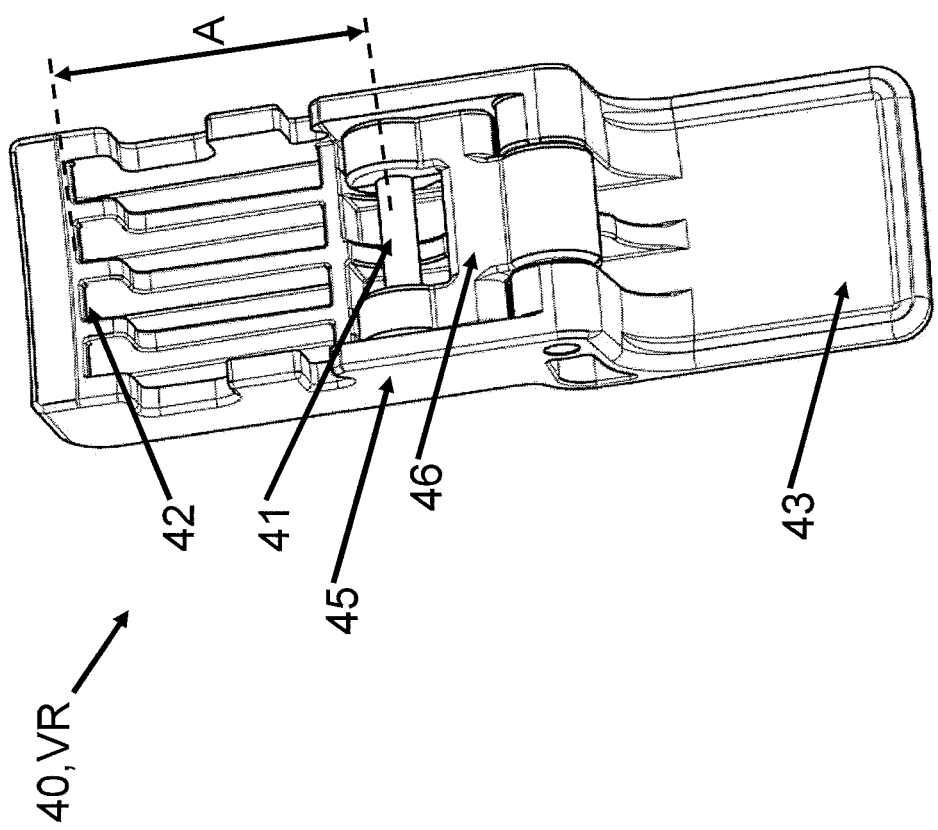
FIG. 9 shows a locking claw.

FIG. 9 shows a locking claw 40 to lock a cover onto a housing of a filter section of a circulation apparatus of the invention. Said locking claw comprises a main segment 45 fitted with an actuation element 43 and an intermediate segment 46 that is kinematically connected in rotatable manner to said main segment and that is fitted with a pivot element 41 for said locking claw. The figure shows the locking claw 40 in a locked position VR, wherein an engaging means 42 configured at the main segment is a distance A from the locking claw's pivot element 41.

The actuation element 43 is a lever arm relative to the locking claw's pivot element 41 and is designed in a way to subtend a radially enclosing free space in each of its positions, allowing a user to grip it without hurting himself when driving the locking claw 40.

The present invention is not restricted to one of the above discussed embodiment modes, on the contrary it may be modified in versatile manner.

All features and advantages, inclusive design details, spatial configurations and method steps, implicit or explicit in the claims, specification and drawing, may be construed inventive both per se or in arbitrary combinations.

LIST OF REFERENCES

| | |
|---|---|
| 100 | circulation apparatus |
| 101 | filter section |
| 102 | pump |
| 103 | drive element |
| 104 | discharge |
| 10 | housing |
| 11 | feed intake |
| 12 | communication aperture |
| 13 | inner side |
| 14 | support element |
| 20 | cover |
| 21 | drive element |
| 23 | support element |
| 30 | pivot element |
| 40 | locking claw |
| 41 | clamping-lock pivot means |
| 42 | engaging means |
| 43 | actuating element |
| 45 | main segment |
| 46 | intermediate segment |
| 50 | filter |
| 51 | drive-element guide |
| 52 | edge |
| 53 | collar |
| 54 | reinforcing rib |
| 60 | guide means |
| 61 | guide means |
| 62 | oblique insertion element |
| 71 | hookup element |
| 72 | hookup element |
| GT | cam drive |
| FS | operational position (filter) |
| ES | extraction position (filter) |
| ZS | intermediate position (filter) |
| GS | closed position (cover) |
| OS | open position (cover) |
| VR | locked position (stop) |
| ER | unlocked position (stop) |

The invention claimed is:

1. A circulation apparatus for baths/pools, comprising a pump powered by a drive element, a filter section constituted by a housing and a cover, and a filter being configured within the housing; wherein
the filter is detachably coupled to the cover using a coupling, and wherein the filter is kinematically coupled to the cover using the coupling, the coupling including at least one first hookup element on the filter and at least one second hookup element on the cover, the at least one first and second hookup elements kinematically coupled to each other to permit a hookup between the cover and the filter, wherein when the cover is moved in a cover opening direction, the filter is raised by the cover via the hookup between the cover and the filter.

2. The circulation apparatus as claimed in claim 1, wherein the at least one first hookup element is a drive pin.

3. The circulation apparatus as claimed in claim 1, wherein the at least one second hookup element is a drive-element guide.

4. The circulation apparatus as claimed in claim 3, characterized in that drive-element guide is integrated into a collar configured in an upper edge of the filter.

5. The circulation apparatus as claimed in claim 1, characterized in that the cover is rotatably supported on a pivot element.

6. The circulation apparatus as claimed in claim 1, characterized in that at least one guide is configured at one or both of the filter and the housing.

7. The circulation apparatus as claimed in claim 6, characterized in that the at least one guide is fitted with an oblique insertion element.

8. The circulation apparatus as claimed in claim 1, characterized in that the housing comprises a support element and the cover comprises a support element.

9. The circulation apparatus as claimed in claim 8, further comprising at least one locking claw fitted with an engaging means.

10. The circulation apparatus as claimed in claim 9, characterized in that the locking claw is supported in kinematically rotatable manner by a clamping-lock pivot element at one of the support elements and in that the engaging means can detachably engage the other one of the support elements.

11. The circulation apparatus as claimed in claim 10, characterized in that the locking claw is constituted by a main segment and by an intermediate segment linked in kinematically rotatable manner to said main segment, and in that the intermediate segment by means of the clamping-lock pivot element rests in one of the support elements and in that the engaging means is mounted on the main segment.

12. The circulation apparatus as claimed in claim 10, characterized in that, in a locked position of the locking claw, a distance (A) between the clamping lock pivot element and the engaging means is equal to a distance B1 between the support elements, and where, when the cover is closed and the locking claw is disengaged in a position (ER), a distance B2 between the support elements is larger than the distance (A).

13. The circulation apparatus as claimed in claim 1, wherein the cover is rotatably supported on a pivot element, the at least one first hookup element is a drive pin, and the at least one second hookup element is a drive element guide, wherein the drive pin and the drive element guide form a cam mechanism converting a motion of the drive pin into a linear motion of the drive element guide, thereby allowing the filter to be raised/lowered relative to the housing.

* * * * *